(12) United States Patent
Nishino et al.

(10) Patent No.: US 8,630,453 B2
(45) Date of Patent: Jan. 14, 2014

(54) IMAGE PROCESSING DEVICE, IMAGE PROCESSING METHOD AND PROGRAM

(75) Inventors: Katsuaki Nishino, Kanagawa (JP); Nobuhiro Tsunashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 235 days.

(21) Appl. No.: 12/958,783

(22) Filed: Dec. 2, 2010

(65) Prior Publication Data

US 2011/0135158 A1 Jun. 9, 2011

(30) Foreign Application Priority Data

Dec. 8, 2009 (JP) ................................ P2009-278787

(51) Int. Cl.
*G06K 9/00* (2006.01)

(52) U.S. Cl.
USPC ............ 382/103; 382/107; 382/173; 382/190

(58) Field of Classification Search
USPC .................. 382/107, 103, 190, 173
See application file for complete search history.

(56) References Cited

U.S. PATENT DOCUMENTS

| | | | | |
|---|---|---|---|---|
| 5,627,905 A * | 5/1997 | Sebok et al. | ................. | 382/107 |
| 6,252,974 B1 * | 6/2001 | Martens et al. | ............... | 382/107 |
| 6,326,994 B1 * | 12/2001 | Yoshimatsu | ..................... | 348/46 |
| 6,335,977 B1 * | 1/2002 | Kage | ............................... | 382/107 |
| 6,466,684 B1 * | 10/2002 | Sasaki et al. | ................... | 382/104 |
| 6,643,387 B1 * | 11/2003 | Sethuraman et al. | ......... | 382/107 |
| 7,103,199 B2 * | 9/2006 | Watanabe et al. | ............. | 382/105 |
| 7,346,191 B2 * | 3/2008 | Sano | .............................. | 382/104 |
| 7,613,321 B2 * | 11/2009 | Altherr et al. | ................. | 382/103 |
| 7,783,076 B2 * | 8/2010 | Tsunashima | ................. | 382/103 |
| 7,982,774 B2 * | 7/2011 | Tsunashima | ................ | 348/208.6 |
| 8,045,757 B2 * | 10/2011 | Tsunashima | ................. | 382/103 |
| 8,068,640 B2 * | 11/2011 | Loos | ............................. | 382/103 |
| 8,068,701 B2 * | 11/2011 | Ujisato et al. | ................. | 382/305 |
| 8,199,202 B2 * | 6/2012 | Watanabe | ................. | 348/208.13 |
| 8,401,291 B2 * | 3/2013 | Otsuki et al. | .................. | 382/172 |
| 8,411,992 B2 * | 4/2013 | Hamada et al. | ............... | 382/275 |
| 8,433,139 B2 * | 4/2013 | Tsunashima | ................. | 382/195 |
| 8,467,575 B2 * | 6/2013 | Nishino et al. | ................. | 382/103 |

(Continued)

FOREIGN PATENT DOCUMENTS

| | | | | |
|---|---|---|---|---|
| JP | 11351862 A | * 12/1999 | ............... | G01C 3/06 |
| JP | 2000 322581 | 11/2000 | | |

(Continued)

*Primary Examiner* — Jayesh A Patel
*Assistant Examiner* — Iman K Kholdebarin
(74) *Attorney, Agent, or Firm* — Frommer Lawrence & Haug LLP; William S. Frommer; Ellen Marcie Emas (57) ABSTRACT

Provided is an image processing device which includes an optical flow computation unit computing optical flow within an image with reference to a past image, an optical flow detection unit setting multiple reference points in a partial region of the image and detecting whether or not optical flow is generated at the reference points, a feature point data storage unit storing, when optical flow is generated at the reference points, as a feature point a set of pixels of pixel data that generated the optical flow, a feature point tracking unit tracking a motion position of the feature point, a feature point deletion unit deleting the tracked feature point in accordance with a variation in motion position of the feature point, and a passage determination unit determining whether or not passage of an object is detected within the image based on multiple remaining undeleted feature points.

9 Claims, 9 Drawing Sheets

(56) References Cited

U.S. PATENT DOCUMENTS

| | | | |
|---|---|---|---|
| 2005/0074141 A1* | 4/2005 | Tsunashima | 382/103 |
| 2005/0196017 A1* | 9/2005 | Altherr et al. | 382/103 |
| 2006/0018516 A1* | 1/2006 | Masoud et al. | 382/115 |
| 2006/0244757 A1* | 11/2006 | Fang et al. | 345/582 |
| 2006/0244866 A1* | 11/2006 | Kishida | 348/699 |
| 2007/0030522 A1* | 2/2007 | Sasaki et al. | 358/302 |
| 2008/0112593 A1* | 5/2008 | Ratner et al. | 382/103 |
| 2008/0187175 A1* | 8/2008 | Kim et al. | 382/103 |
| 2009/0220158 A1 | 9/2009 | Tsunashima | 382/201 |
| 2009/0252377 A1* | 10/2009 | Akita et al. | 382/106 |
| 2010/0290672 A1* | 11/2010 | Nishino et al. | 382/103 |
| 2011/0135158 A1* | 6/2011 | Nishino et al. | 382/107 |
| 2011/0243385 A1* | 10/2011 | Nishino et al. | 382/103 |

FOREIGN PATENT DOCUMENTS

| | | | | | |
|---|---|---|---|---|---|
| JP | 2001041803 | A | * | 2/2001 | G01F 23/28 |
| JP | 2002049911 | A | * | 2/2002 | G06T 1/00 |
| JP | 2002245404 | A | * | 8/2002 | G06K 9/20 |
| JP | 2002344952 | A | * | 11/2002 | H04N 7/18 |
| JP | 2002358529 | A | * | 12/2002 | G06T 7/60 |
| JP | 2003242440 | A | * | 8/2003 | G06K 9/03 |
| JP | 2003294854 | A | * | 10/2003 | G01V 8/10 |
| JP | 2004 13615 | | | 1/2004 | |
| JP | 2004072478 | A | * | 3/2004 | H04N 7/18 |
| JP | 2004096488 | A | * | 3/2004 | H04N 7/18 |
| JP | 2005027046 | A | * | 1/2005 | H04N 5/232 |
| JP | 2005070985 | A | * | 3/2005 | G06T 7/00 |
| JP | 2006107457 | A | * | 4/2006 | |
| JP | 2006 260049 | | | 9/2006 | |
| JP | 2007028120 | A | * | 2/2007 | |
| JP | 2007288803 | A | * | 11/2007 | |
| JP | 2007334631 | A | * | 12/2007 | |
| JP | 2008046769 | A | * | 2/2008 | |
| JP | 2008060967 | A | * | 3/2008 | |
| JP | 2008078926 | A | * | 4/2008 | |
| JP | 2009211330 | A | * | 9/2009 | |
| JP | 2010136224 | A | * | 6/2010 | |
| JP | 2010161701 | A | * | 7/2010 | |
| JP | 2010267055 | A | * | 11/2010 | |
| JP | 2010271939 | A | * | 12/2010 | |
| JP | 2011123563 | A | * | 6/2011 | |
| JP | 2011124800 | A | * | 6/2011 | |
| JP | 2011192141 | A | * | 9/2011 | |
| JP | 2011210179 | A | * | 10/2011 | |
| JP | 2011214872 | A | * | 10/2011 | |
| JP | 2011214874 | A | * | 10/2011 | |
| JP | 2011215695 | A | * | 10/2011 | |
| JP | 2011242229 | A | * | 12/2011 | |
| JP | 2012138807 | A | * | 7/2012 | |

* cited by examiner

FIG.9

IMAGE PROCESSING DEVICE, IMAGE PROCESSING METHOD AND PROGRAM

BACKGROUND OF THE INVENTION

1. Field of the Invention

The present invention relates to an image processing device, an image processing method and a program.

2. Description of the Related Art

When a suspicious person or the like is monitored by use of an imaging device such as a monitoring camera, looking for the suspicious person by gazing on a monitor puts a heavy burden on an observer. Therefore, in monitoring by use of a monitoring camera or the like, a motion detection technique to detect a moving object (hereafter, also referred to as a moving body) within a screen image is used, which is one of the image processing techniques.

In motion detection processing, it is necessary to reduce false detection due to a disturbance and to reliably detect passage of an intended object. Techniques related to object detection are disclosed, for example, in JP-A-2004-13615, JP-A-2000-322581 and JP-A-2006-A-260049. In JP-A-2004-13615, a disturbance is removed using optical flow. In JP-A-2000-322581, an image region in which motion occurs is detected in order to distinguish between a fluctuation and a moving object, and tracking on the detected image region is performed. In JP-A-2006-260049, the degree of disorder of a motion vector is used in order to detect a moving object with a high accuracy.

SUMMARY OF THE INVENTION

In the related art, there was a technique to determine, based on information that a moving body had been detected, whether or not the moving object had passed across a previously designated region. Further, in motion detection using luminance variation of pixels, there was a method of controlling not to detect a disturbance region in which a disturbance occurred using information about past statistic luminance variation, in order to remove a disturbance. However, a disturbance such as waver of trees or the like did not constantly occur, and thereby false detection could be caused. Furthermore, there was also a method of actually detecting motion of an object and a certain level of false detection could be reduced. However, there was an issue that false detection had been locally performed, resulting in insufficient reduction of the false detection.

The technique in JP-A-2004-13615 is applied only to information in a short interval and therefore fails to take sufficient measure against a disturbance such as waver of trees or the like. Further, in JP-A-2000-322581 and JP-A-2006-260049, detection of a passing object is performed for a single pixel, and thereby, a small object is also detected and there arises an issue that false detection occurs. Furthermore, when a moving object is uniformly detected on the whole screen, there is an issue that throughput for motion detection processing grows explosively.

In light of the foregoing, it is desirable to provide an image processing device, an image processing method and a program that are novel and improved, and that are capable of reducing false detection due to a disturbance and detecting only an intended object with a high accuracy, while reducing throughput.

According to an embodiment of the present invention, there is provided an image processing device including an optical flow computation unit that computes optical flow within an image with reference to a past image, an optical flow detection unit that sets multiple reference points in a partial region of the image and detects whether or not optical flow is generated at the reference points, a feature point data storage unit that stores, when optical flow is generated at the reference points, as a feature point a set of peaces of pixel data that generated the optical flow, a feature point tracking unit that tracks a motion position of the feature point, a feature point deletion unit that deletes the tracked feature point in accordance with a variation in motion position of the feature point, and a passage determination unit that determines whether or not passage of an object is detected within the image based on multiple remaining undeleted feature points.

The passage determination unit may determine whether or not passage of an object is detected within the image, based on the number of the multiple remaining undeleted feature points of multiple feature points generated at the same time when the optical flow was generated.

The passage determination unit may determine whether or not passage of an object is detected within the image, based on a distance between the multiple remaining undeleted feature points and motion directions of the multiple remaining undeleted feature points.

The feature point deletion unit may delete the tracked feature point based on a motion direction of the feature point.

The feature point deletion unit may delete the tracked feature point based on motion speed of the feature point.

The feature point deletion unit may delete the tracked feature point based on relationship between a feature point and another feature point.

The feature point deletion unit may delete the tracked feature point based on tracking elapsed time of the feature point.

According to another embodiment of the present invention, there is provided an image processing method, including the steps of computing optical flow within an image with reference to a past image by an optical flow computation unit, setting multiple reference points in a partial region of the image and detecting whether or not optical flow is generated at the reference points by an optical flow detection unit, storing, when optical flow is generated at the reference points, as a feature point a set of peaces of pixel data that generated the optical flow by a feature point data storage unit, tracking a motion position of the feature point by a feature point tracking unit, deleting the tracked feature point in accordance with a variation in motion position of the feature point by a feature point deletion unit, and determining whether or not passage of an object is detected within the image based on multiple remaining undeleted feature points by a passage determination unit.

According to another embodiment of the present invention, there is provided a program for causing a computer to perform the steps of computing optical flow within an image with reference to a past image, setting multiple reference points in a partial region of the image and detecting whether or not optical flow is generated at the reference points, storing, when optical flow is generated at the reference points, as a feature point a set of peaces of pixel data that generated the optical flow, tracking a motion position of the feature point, deleting the tracked feature point in accordance with a variation in motion position of the feature point, and determining whether or not passage of an object is detected within the image based on multiple remaining undeleted feature points.

According to the embodiments of the present invention described above, it is possible to reduce false detection due to a disturbance and to detect only an intended object with a high accuracy, while reducing throughput.

DETAILED DESCRIPTION OF THE EMBODIMENT(S)

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Explanation will be made in the following order:
1. Configuration according to an embodiment,
2. Operations according to an embodiment.

[1. Configuration According to an Embodiment]

Figure 1:
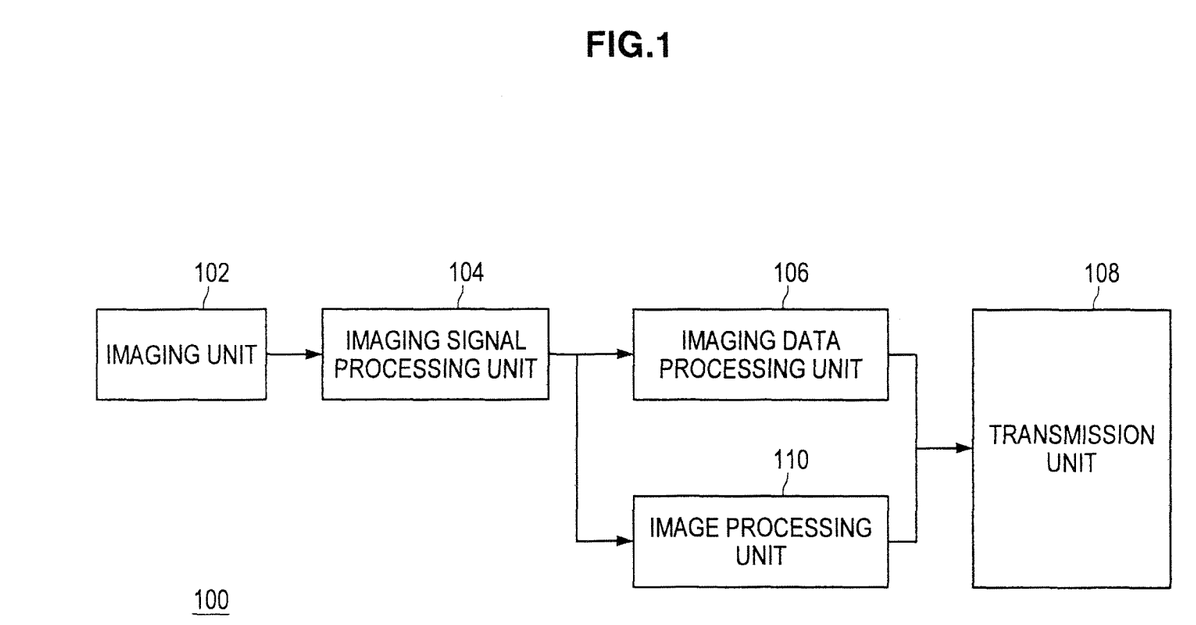
FIG. 1 is a block diagram illustrating an imaging device 100 according to an embodiment of the present invention.

First, a configuration of an imaging device 100 according to an embodiment of the present invention will be explained with reference to FIG. 1. FIG. 1 is a block diagram illustrating the imaging device 100 according to the present embodiment. The imaging device 100 is, for example, a monitoring camera which is fixed in a place and images an object of monitoring such as a person or vehicle that passes across an imaging range. The imaging device 100 transmits image data obtained by the imaging to a monitoring board or the like having a monitor. According to the present embodiment, it is possible to detect an object of monitoring with a high accuracy, without an observer constantly gazing on a monitor.

The imaging device 100 includes an imaging unit 102, an imaging signal processing unit 104, an imaging data processing unit 106, a transmission unit 108 and an image processing unit 110.

The imaging unit 102 includes, for example, an optical system such as lens and an imaging element such as a CCD image sensor or a CMOS image sensor. The imaging unit 102 receives light from a subject and converts the light into an electric signal. The imaging unit 102 transmits the generated electric signal to the imaging signal processing unit 104.

The imaging signal processing unit 104 changes the signal received from the imaging unit 102 to a video signal for a color image or the like, or performs de-noising processing or the like on the video signal. The imaging signal processing unit 104 transmits the processed video signal to the imaging data processing unit 106 and the image processing unit 110.

The imaging data processing unit 106 performs compression processing and the like on the video signal processed in the imaging signal processing unit 104 so as to change the format of the video signal into a format which allows the video signal to be transmitted from the transmission unit 108.

The transmission unit 108 transmits the video signal received from the imaging signal processing unit 106 and metadata received from the image processing unit 110 to the outside, after associating the video signal with the metadata. The video signal or metadata from the transmission unit 108 is output to, for example, a network or a monitoring board which is connected to the network.

The image processing unit 110 receives the video signal processed in the imaging signal processing unit 104 and generates metadata by performing image processing on the video signal. In the present embodiment, metadata is information that an object of monitoring has passed across an imaging range or a partial region of an image, and serves as an alarm signal or the like, for example.

Besides, in the present embodiment, the transmission unit 108 may transmit both a video signal and metadata to the outside, but the present invention is not limited to this example. For example, it may be that the transmission unit 108 does not output a video signal, but outputs only metadata such as an alarm to the outside.

Further, in the above description, the imaging device 100 such as a monitoring camera, having the imaging unit 102, has been explained. However, in the present invention, a signal converting device without the imaging unit 102 may be also used. The signal converting device has, instead of the imaging unit 102, an input unit connectable to a camera which outputs an analog video signal. The signal converting unit generates metadata based on the analog video signal and outputs the metadata to the outside.

Furthermore, in the above description, the imaging device 100 having the imaging data processing unit 106 has been explained. However, in the present invention, a dedicated device for image processing may be also used. The dedicated device for image processing is, for example, a personal computer or a server or the like. The dedicated device for image processing has an image processing unit 110 that receives video signal and generates metadata. The generated metadata may be output to the outside, or it may be output to a monitor, a warning light or the like, which is connected to the dedicated device for image processing.

[Image Processing Unit 110]

Figure 2:
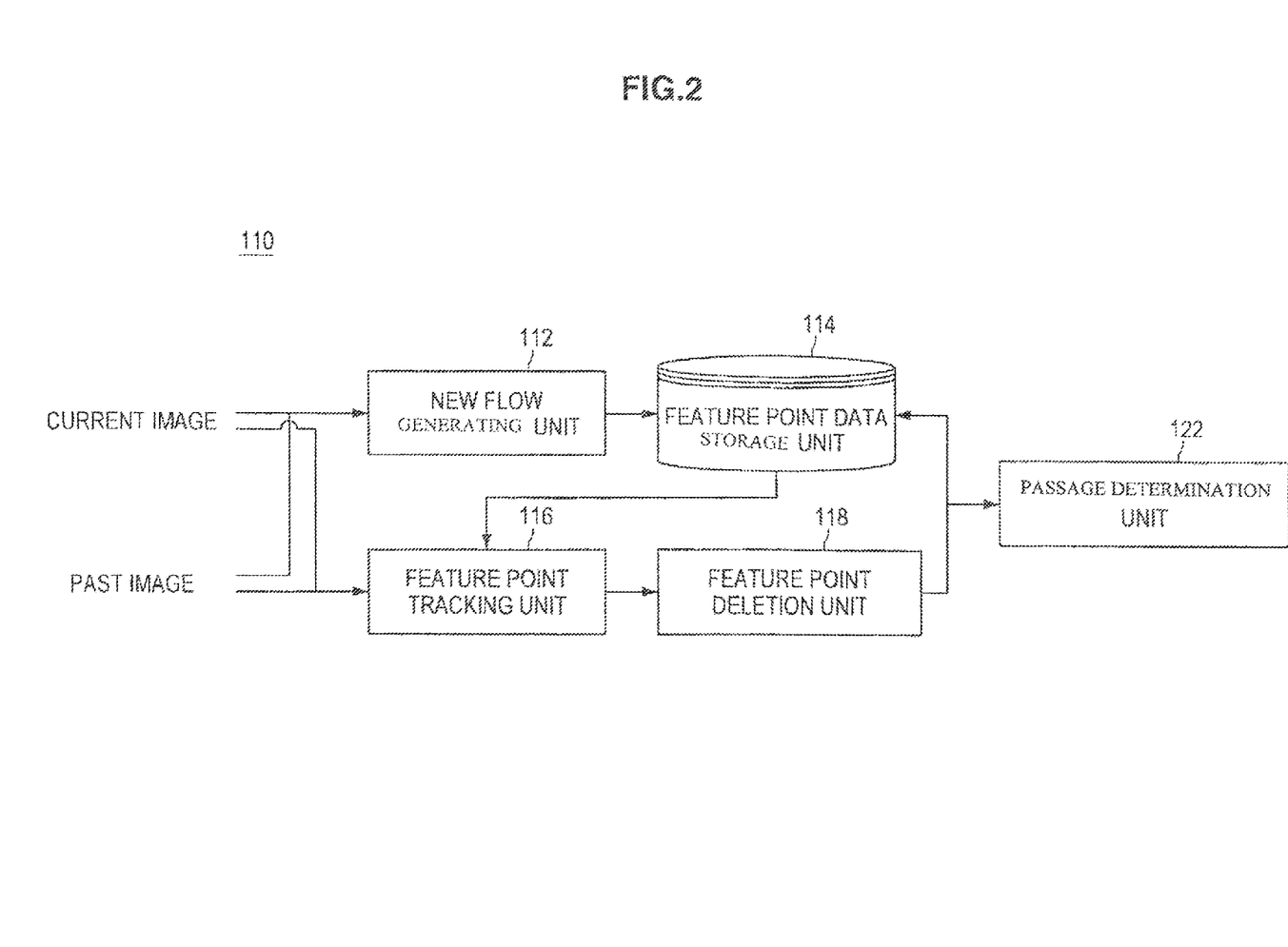
FIG. 2 is a block diagram illustrating an image processing unit 110 according to the embodiment.

Next, an image processing unit 110 according to the present embodiment will be explained with reference to FIG. 2. FIG. 2 is a block diagram illustrating the image processing unit 110 according to the present embodiment. The image processing unit 110 includes, for example, a new flow generating unit 112, a feature point data storage unit 114, a feature point tracking unit 116, a feature point deletion unit 118, a passage determination unit 122 and the like.

In the present embodiment, it is determined, by tracking multiple optical flow-based feature points each generated from a specific place on the screen, whether or not a passing object exists within the screen. More specially, an abnormal feature point is extracted that performs such a motion that would not be performed by a normal intruding object such as a person or vehicle as an object of monitoring, like a vibration-like motion of a fluctuation of the nature such as trees of waves, or a motion whose speed suddenly varies after one frame. Then, an abnormal feature point is deleted from among objects to be tracked, and it is determined whether or not the multiple remaining undeleted feature points are moving together in a group in the same direction. When more than a predetermined number of the remaining feature points are moving in a group, a passing object is detected as an intruding object such as a person or vehicle to be monitored. Because a disturbance may be reliably removed, detection of a passing object according to the present embodiment is disturbance-resistant detection.

Figure 4:
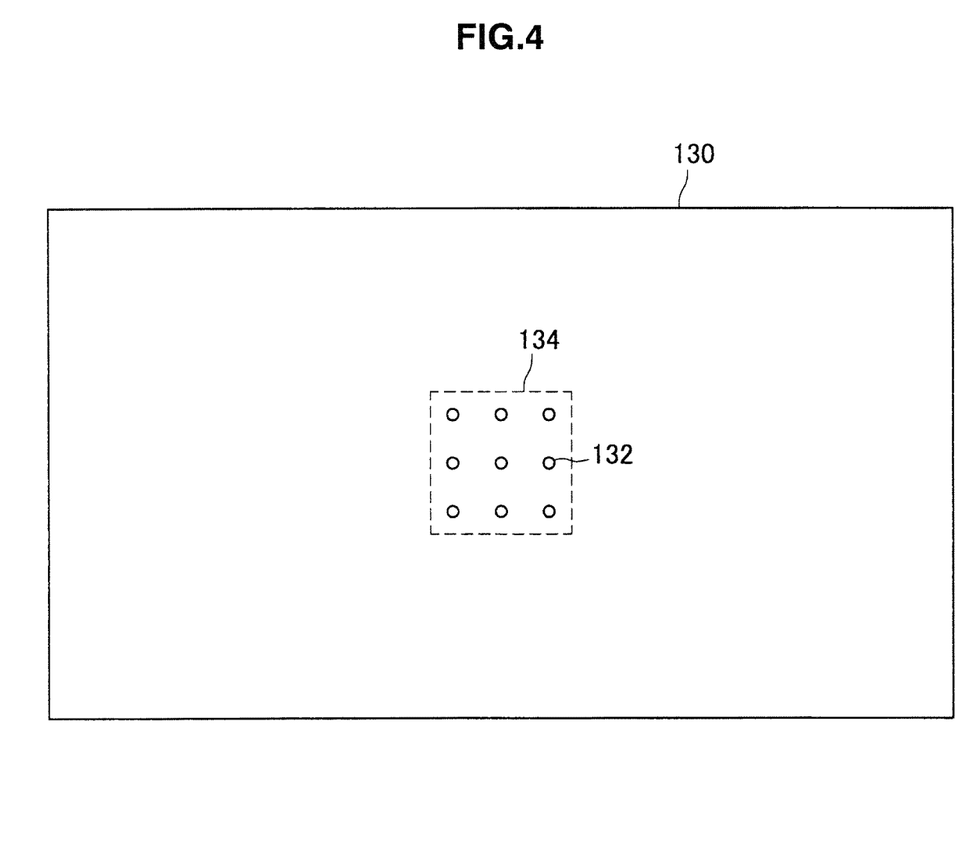
FIG. 4 is an explanatory diagram illustrating an example of an image 130 on which reference points 132 are set.

The new flow generating unit 112 includes, for example, an optical flow computation unit and an optical flow detection unit. The optical flow computation unit computes optical flow within an image with reference to a past image. An optical flow detection unit sets multiple reference points 132 in a partial region 134 of an image 130 as shown in FIG. 4 and detects whether or not optical flow is generated at the reference points 132. FIG. 4 is an explanatory diagram illustrating an example of the image 130 on which the reference points 132 are set. As reference point 132 set are nine points, for example. Further, the reference points 132 exist locally in the image 130. Besides, the region 134 in which the reference points 132 exists may be located in the center of the image 130 or at the edges of the image 130. Furthermore, the number of the region 134 is not limited to one, but may be two or more.

In computing optical flow, a past image is referred to, which is an image of a predetermined previous time, for example, an image of a preceding frame. The optical flow computation unit computes constantly optical flow. Then, every time generation of optical flow is detected at the reference points 132, the optional flow computation unit registers, as a feature point to be tracked, a set of pixels of pixel data that generated the optical flow in a feature point data storage unit 114. Therefore, even though optical flow is newly generated with a time lag at the reference points 132, the feature point at that time is newly registered in the feature point data storage unit 114. Therefore, even though two persons get into an image with a time lag, passage for each person can be individually determined.

As to the computation of optical flow, techniques of the related art can be applied and there are various kinds of techniques for optical flow. For example, there is a method of computing optical flow, by performing template matching by a block including multiple pixels. Further, optical flow may be computed using gradient method based on time variation in luminance distribution within a block.

When optical flow is generated at the reference points 132, the feature point data storage unit 114 stores as a feature point a set of pixels of pixel data that generated the optical flow. The feature point data storage unit 114 outputs the feature point data to the feature point tracking unit 116 so that the feature point can be used in tracking from the next frame. Besides, when optical flow is very small, it is highly possible that it is a non-moving object, the background or the like. Accordingly, the corresponding feature point, is not stored in the feature point data storage unit 114.

The feature point tracking unit 116 tracks a feature point stored in the feature point data storage unit 114 for each frame, for example. Tracking processing is processing for determining to which position the feature point is moving in the current frame image. The tracking processing is performed using template matching or gradient method in a similar way to the computation of optical flow in the new flow generating unit 112.

Figure 5:
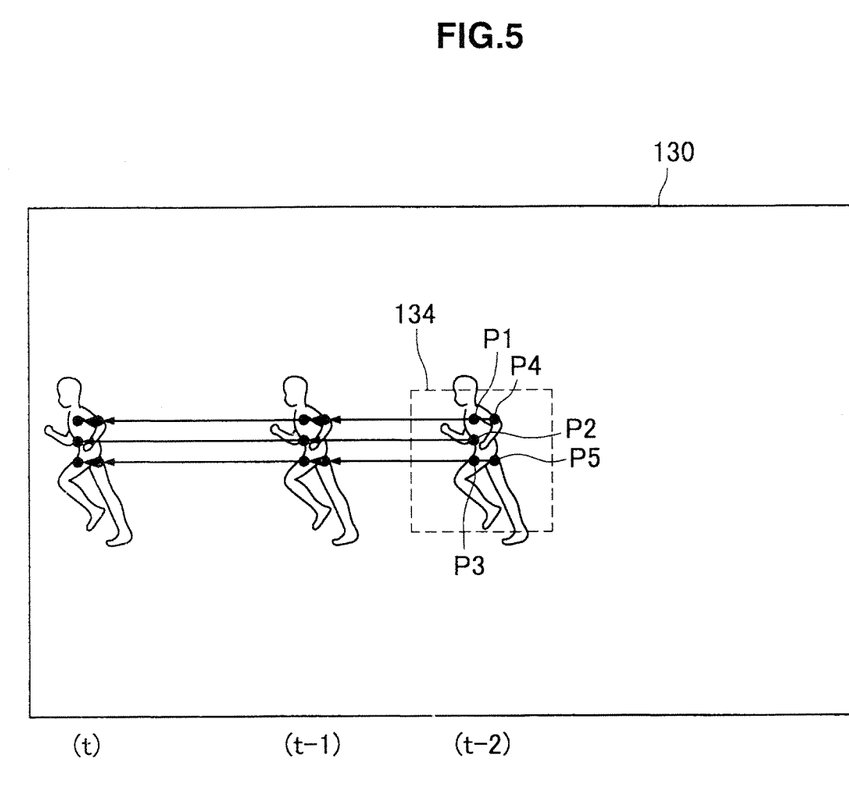
FIG. 5 is an explanatory diagram illustrating the concept of tracking processing.
Figure 6:
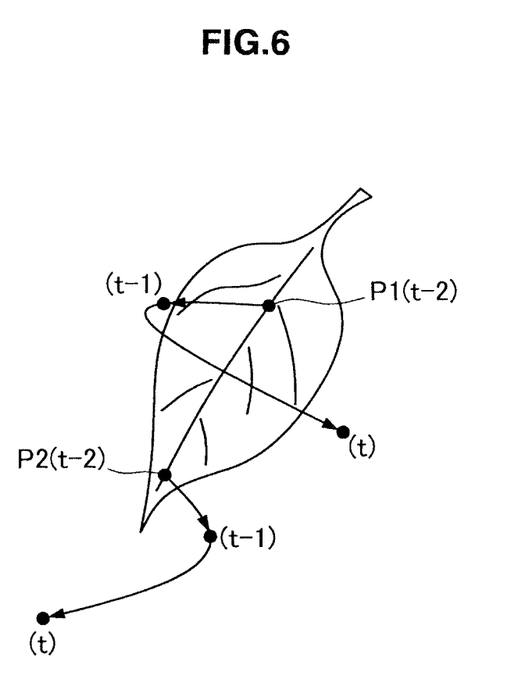
FIG. 6 is an explanatory diagram illustrating the concept of tracking processing.

FIGS. 5 and 6 are explanatory diagrams illustrating the concept of tracking processing. FIG. 5 shows a case where optical flow is generated due to passage of a person at five reference points P1-P5 of nine reference points 132 on the image 130 showed in FIG. 4. Further, FIG. 6 shows a case where optical flow is generated due to passage of a leaf at two reference points P1, P2 of nine reference points 132 on the image 130 showed in FIG. 4. Feature points detected and stored at the time t−2 are tracked for each frame, namely at the time t−1 and at the time t.

Figure 7A:
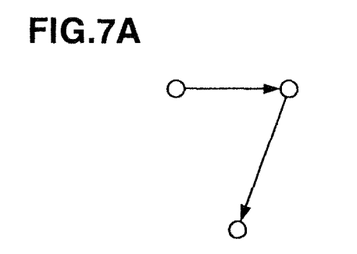
FIGS. 7A-7D are explanatory diagrams illustrating motion of a feature point.

The feature point deletion unit 118 computes a motion position, motion speed or the like of a tracked feature point based on coordinates information indicating a position of the feature point, and deletes such a feature point that matches the following conditions from among objects to be tracked. As a deletion condition, for example as shown in FIG. 7A, a case is mentioned where a motion direction of a feature point suddenly varies over frames. The reason is that such a variation in motion direction would not occur due to motion of an object of monitoring such as a person or vehicle. FIGS. 7A-7D are explanatory diagrams illustrating motion of a feature point.

Figure 8A:
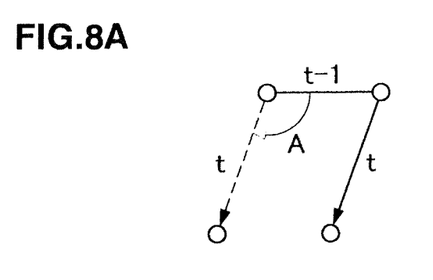
FIGS. 8A and 8B are explanatory diagrams illustrating motion of a feature point.
Figure 8B:
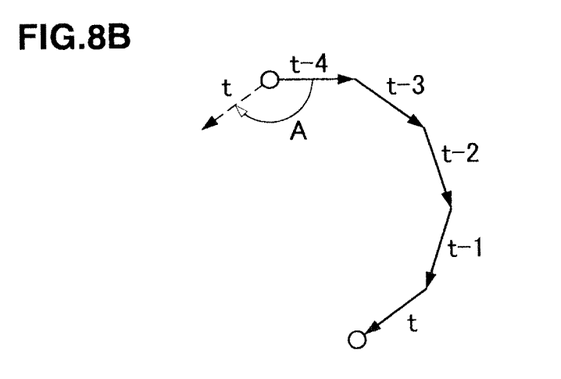

Besides, as shown in FIG. 8A, when the angle A formed by vectors over two successive frames is equal to or greater than a predetermined angle, it is determined that a feature point which moves to form the angle A is to be deleted. Or as shown in FIG. 8B, when the angle A formed by vectors over multiple frames is equal to or greater than a predetermined angle, it may be determined that a feature point which moves to form the angle A is to be deleted. FIGS. 8A and 8B are explanatory diagrams illustrating motion of a feature point.

Figure 7B:
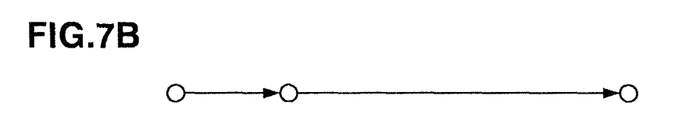

Furthermore, as a deletion condition, a case is mentioned where motion speed of a feature point suddenly varies over frames, as shown in FIG. 7B. As to variation in motion speed, speed at which motion of an object of monitoring such as a person or vehicle would not occur may be set as a deletion condition.

Figure 7C:
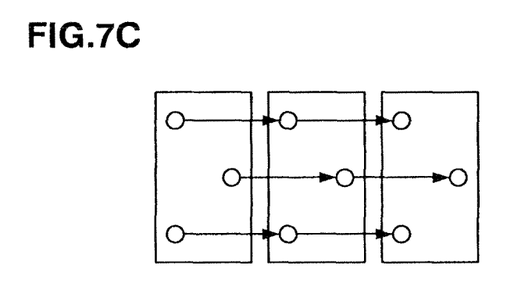
Figure 7D:
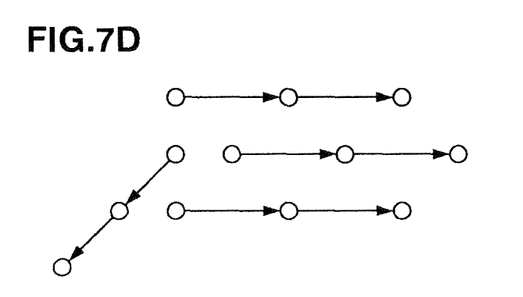

As shown in FIG. 7C, when multiple feature point exist within a certain range and move in the same direction, it is highly possible that it is no disturbance but a passing object. On the other hand, as shown in FIG. 7D, when a feature point is moving alone in a direction under a circumstance where there are not any other feature points moving in the same direction within a certain range, it is high possible that it is a disturbance. Accordingly, the feature point is deleted from among feature objects to be tracked, when there are not any other feature points moving in the same direction within a certain range.

Furthermore, when long-duration tracking is not necessary, a feature point having been tracked for a long time may be also deleted. An algorithm may be set by which up to 20 frames, for example, are tracked.

After deletion processing is performed, the passage determination unit 122 determines whether or not passage of an object is detected within an image with reference to multiple remaining undeleted peaces of feature point data. For example, in a case where it is passage of a person or the like as shown in FIG. 5, which is no disturbance or the like, multiple feature points are close to each other and move in the same direction. Here, in order to reliably determine that it is no disturbance but a person or the like, a condition may be also set that the number of the multiple feature points is equal to or more than a predetermined number.

Figure 9:
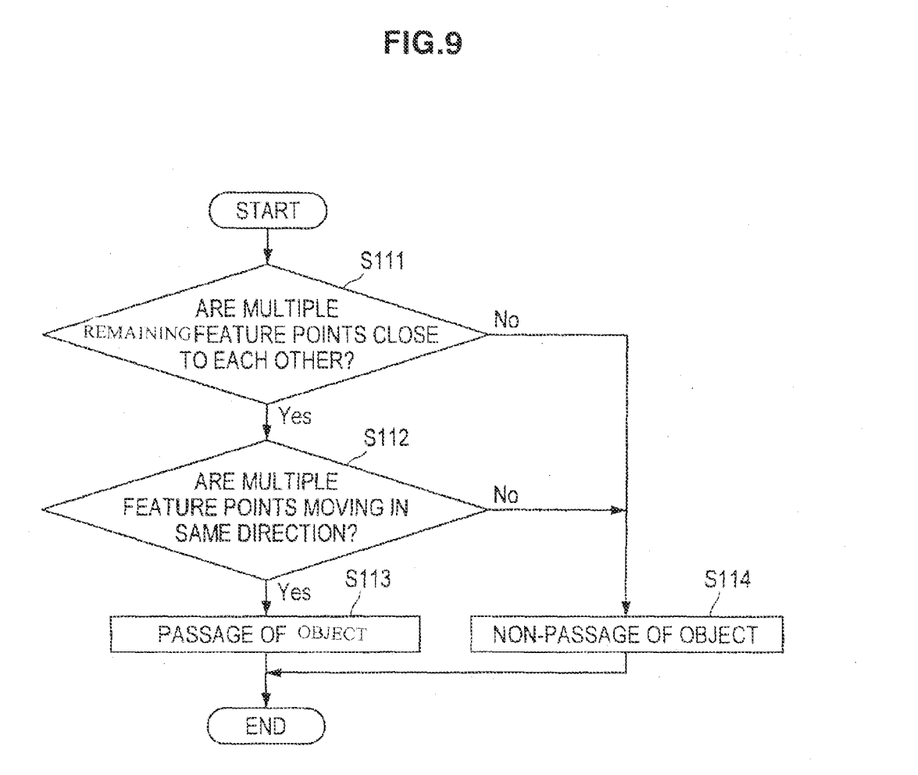
FIG. 9 is a flowchart illustrating operations of a passage determination unit 122 according to the embodiment.

Accordingly, it is determined whether the number of the multiple remaining undeleted feature points of multiple feature points generated at the same time when optical flow was generated is equal to or more than a predetermined number. Further, as shown in a flowchart of FIG. 9, a distance between the multiple remaining feature points and motion directions of the multiple remaining feature points are determined (steps S111, S112). FIG. 9 is a flowchart showing operations of the passage determination unit 122 according to the present embodiment. When more than a certain number of the feature points remain and are moving in the same direction, being together within a certain distance range, the passage determination unit 122 determines that an object has passed (step S113).

For example, it may be set to determine that an object has passed, when optical flow is generated at nine points and of the nine points, for example, at least four points remain and the at least four points are moving in the same direction, being together within a certain distance range.

On the other hand, when more than a certain number of features points do not remain, when feature points are not together within a certain distance range, or when feature points do not move in the same direction, it is determined that no object has passed (step S114). For example, as shown in FIG. 6, when it is a disturbance (for example, a leaf or the like), which is neither person nor vehicle, it is considered as non-passage of an object of monitoring.

[2. Operations According to an Embodiment]

Figure 3:
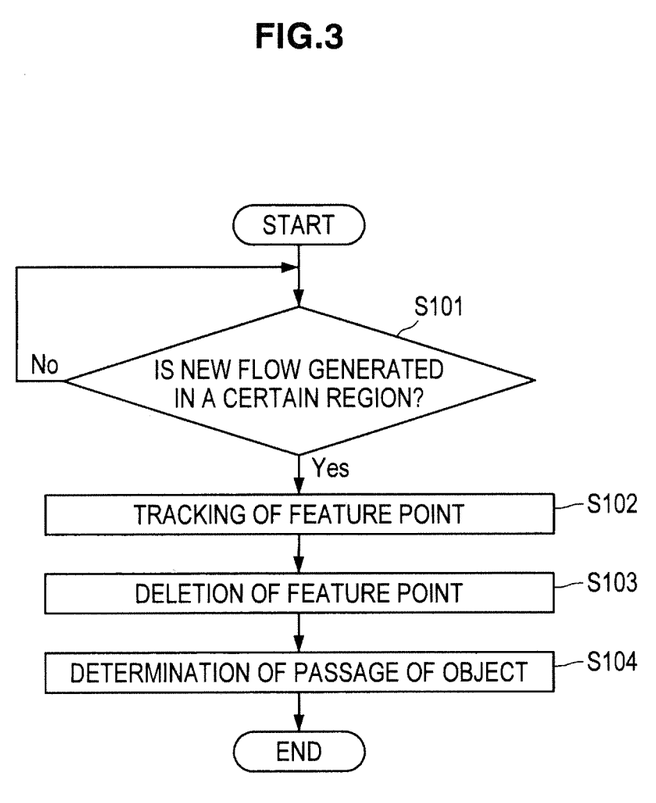
FIG. 3 is a flowchart illustrating operations of the image processing unit 110 according to the embodiment.

As described above, according to the present embodiment, an image processing unit 110 operates as shown in FIG. 3. FIG. 3 is a flowchart showing operations of the image processing 110 according to the present embodiment. First, it is determined whether or not new optical flow is generated in a certain region (step S101). Then, a set of pixels of pixel data that generated optical flow at the reference points included in, for example, the certain region is tracked as a feature point (step S102).

Of tracked feature points, a feature point that obviously performs an abnormal motion is deleted (step S103). Finally, when more than a certain number of the feature points are moving together in the same direction, it is considered as passage of an object (step S104). As described above, in the present embodiment, feature points moving together in the same direction remain. Thus, by grouping feature points and deleting a feature point that cannot be put in a group, it is possible to reliably detect a moving object being beyond a certain size and, in contrary, to remove a small object that may become a disturbance. On the other hand, in the related art, feature points were not grouped and the number of the feature points was not counted.

Further, in the present embodiment, a generation region of optical flow is limited to a certain region and multiple localized reference points. Thereby, it is only necessary to determine in a given region whether multiple feature points perform the same motion in the same direction, or whether the multiple feature points perform a qualitatively different motion from that of a disturbance. Accordingly, in contrast to a case where optical flow is uniformly computed on the whole screen as in the related art, computation amount necessary for tracking is reduced. Thus, the present embodiment makes it possible to reduce false detection due to a disturbance and to detect only an intended object with a high accuracy, while reducing throughput.

It should be understood by those skilled in the art that various modifications, combinations, sub-combinations and alterations may occur depending on design requirements and other factors insofar as they are within the scope of the appended claims or the equivalents thereof.

For example, in the above embodiment, nine reference points are set within an image, but the present invention is not limited to this example. The number of the reference points is variable depending on an object of monitoring or a device. And it may be set that the passage determination unit determines that an object has passed when feature points almost more than half of reference points remain. For example, in a case where there are twenty reference points, it may be set that the passage determination unit determines that an object has passed when at least ten feature points remain.

Setting of the number of remaining feature points for determining whether an object has passed relates to the resistance against a disturbance. For example, when the resistance against a disturbance is set to be strong, the number of the feature point is set to be large. On the other hand, when the number of the feature point is reduced, it is unfavorably easily reacted also on a disturbance, but it is possible to easily detect a passing object such as a person or the like.

The present application contains subject matter related to that disclosed in Japanese Priority Patent Application JP 2009-278787 filed in the Japan Patent Office on Dec. 8, 2009, the entire content of which is hereby incorporated by reference.

What is claimed is:

1. An image processing device comprising:
an optical flow computation unit that computes optical flow only within a partial region of an image for multiple reference points within the partial region with reference to a past image;
an optical flow detection unit that detects whether or not optical flow is generated at the reference points inside the partial region;
a feature point data storage unit that stores as a feature point, when optical flow is generated at the reference points inside the partial region, a set of pixels of pixel data for the reference points in the partial region that generated the optical flow;
a feature point tracking unit that tracks a motion position of the feature point for each frame in the partial region;
a feature point deletion unit that deletes the tracked feature point in the partial region in accordance with a sudden variation in motion position of the feature point over frames relative to a group of feature points that move in a same direction within the partial region, wherein the feature point is deleted when it cannot be put into the group of feature points that move in the same direction within the partial region; and
a passage determination unit that determines whether or not passage of an object is detected within the image based on a predetermined number of multiple remaining undeleted feature points moving together in the group in the same direction within the partial region.

2. The image processing device according to claim 1, wherein the passage determination unit determines whether or not passage of an object is detected within the image, based on the number of the multiple remaining undeleted feature points of multiple feature points generated at the same time when the optical flow was generated.

3. The image processing device according to claim 1, wherein the passage determination unit determines whether or not passage of an object is detected within the image, based on a distance between the multiple remaining undeleted feature points and motion directions of the multiple remaining undeleted feature points.

4. The image processing device according to claim 1, wherein the feature point deletion unit deletes the tracked feature point based on a motion direction of the feature point.

5. The imaging processing device according to claim 1, wherein the feature point deletion unit, deletes the tracked feature point based on motion speed of the feature point.

6. The imaging processing device according to claim 1, wherein the feature point deletion unit deletes the tracked feature point based on relationship between a feature point and another feature point.

7. The image processing device according to claim 1, wherein the feature point deletion unit deletes the tracked feature point based on tracking elapsed time of the feature point.

8. An image processing method, comprising the steps of:
computing optical flow only within a partial region of an image for multiple reference points within the partial region with reference to a past image by an optical flow computation unit;
detecting whether or not optical flow is generated at the reference points inside the partial region by an optical flow detection unit;
storing as a feature point, when optical flow is generated at the reference points inside the partial region, a set of pixels of pixel data for the reference points in the partial region that generated the optical flow by a feature point data storage unit;
tracking a motion position of the feature point for each frame in the partial region by a feature point tracking unit;
deleting the tracked feature point in the partial region in accordance with a sudden variation in motion position of the feature point over frames by a feature point deletion unit relative to a group of feature points that move in a same direction within the partial region, wherein the feature point is deleted when it cannot be put into the group of feature points that move in the same direction within the partial region; and
determining whether or not passage of an object is detected within the image based on a predetermined number of multiple remaining undeleted feature points moving together in the group in the same direction within the partial region by a passage determination unit.

9. A program embodied on a non-transitory computer readable medium for causing a computer to perform the steps of:
computing optical flow only within a partial region of an image for multiple reference points within the partial region with reference to a past image;
detecting whether or not optical flow is generated at the reference points inside the partial region;
storing as a feature point, when optical flow is generated at the reference points inside the partial region, a set of pixels of pixel data for the reference points in the partial region that generated the optical flow;
tracking a motion position of the feature point for each frame in the partial region;
deleting the tracked feature point in the partial region in accordance with a sudden variation in motion position of the feature point over frames relative to a group of feature points that move in a same direction within the partial region, wherein the feature point is deleted when it cannot be put into the group of feature points that moving in the same direction within the partial region; and
determining whether or not passage of an object is detected within the image based on a predetermined number of multiple remaining undeleted feature points moving together in the group in the same direction within the partial region.

* * * * *